(12) United States Patent
Kim

(10) Patent No.: US 9,960,616 B2
(45) Date of Patent: May 1, 2018

(54) ELECTRONIC DEVICE AND METHOD FOR CHARGING AND DISCHARGING IN ELECTRONIC DEVICE

(71) Applicant: Samsung Electronics Co., Ltd., Suwon-si, Gyeonggi-do (KR)

(72) Inventor: Jong-Min Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 14/876,049

(22) Filed: Oct. 6, 2015

(65) Prior Publication Data

US 2016/0099594 A1    Apr. 7, 2016

(30) Foreign Application Priority Data

Oct. 6, 2014    (KR) .................. 10-2014-0134567

(51) Int. Cl.
*H02J 7/00*    (2006.01)

(52) U.S. Cl.
CPC .......... *H02J 7/0047* (2013.01); *H02J 7/0044* (2013.01); *H02J 7/0054* (2013.01); *H02J 2007/005* (2013.01); *H02J 2007/0049* (2013.01); *H02J 2007/0062* (2013.01)

(58) Field of Classification Search
CPC .................................................... H02J 7/0047
USPC .......................................................... 320/114
See application file for complete search history.

(56) References Cited

U.S. PATENT DOCUMENTS

| | | |
|---|---|---|
| 2008/0222438 A1 | 9/2008 | Lin et al. |
| 2009/0027010 A1 | 1/2009 | Ha et al. |
| 2009/0058370 A1 | 3/2009 | Odaohhara |
| 2009/0109639 A1 | 4/2009 | Li |
| 2010/0298029 A1* | 11/2010 | Jang ................. G06F 1/266 |
| | | 455/557 |
| 2013/0238819 A1 | 9/2013 | Oljaca et al. |
| 2013/0278205 A1* | 10/2013 | Mullins ............. G06F 21/44 |
| | | 320/107 |
| 2014/0032953 A1 | 1/2014 | Wei et al. |

FOREIGN PATENT DOCUMENTS

| | | |
|---|---|---|
| CN | 102880238 A | 1/2013 |
| EP | 2 713 280 A2 | 4/2014 |
| EP | 2 879 014 A1 | 6/2015 |
| JP | 2013-229959 A | 11/2013 |
| KR | 10-2009-0079458 A | 7/2009 |
| KR | 10-1216145 B1 | 12/2012 |
| KR | 20-2013-0007314 U | 12/2013 |

* cited by examiner

*Primary Examiner* — Edward Tso
*Assistant Examiner* — Ahmed Omar
(74) *Attorney, Agent, or Firm* — Jefferson IP Law, LLP

(57) ABSTRACT

An electronic device is provided. The electronic device includes a connection terminal to which a charging cable or a discharging cable can be connected, a charging/discharging unit configured to perform a charging operation or a discharging operation, and a controller configured to perform a charging or discharging operation based on a cable connected to the connection terminal.

19 Claims, 7 Drawing Sheets

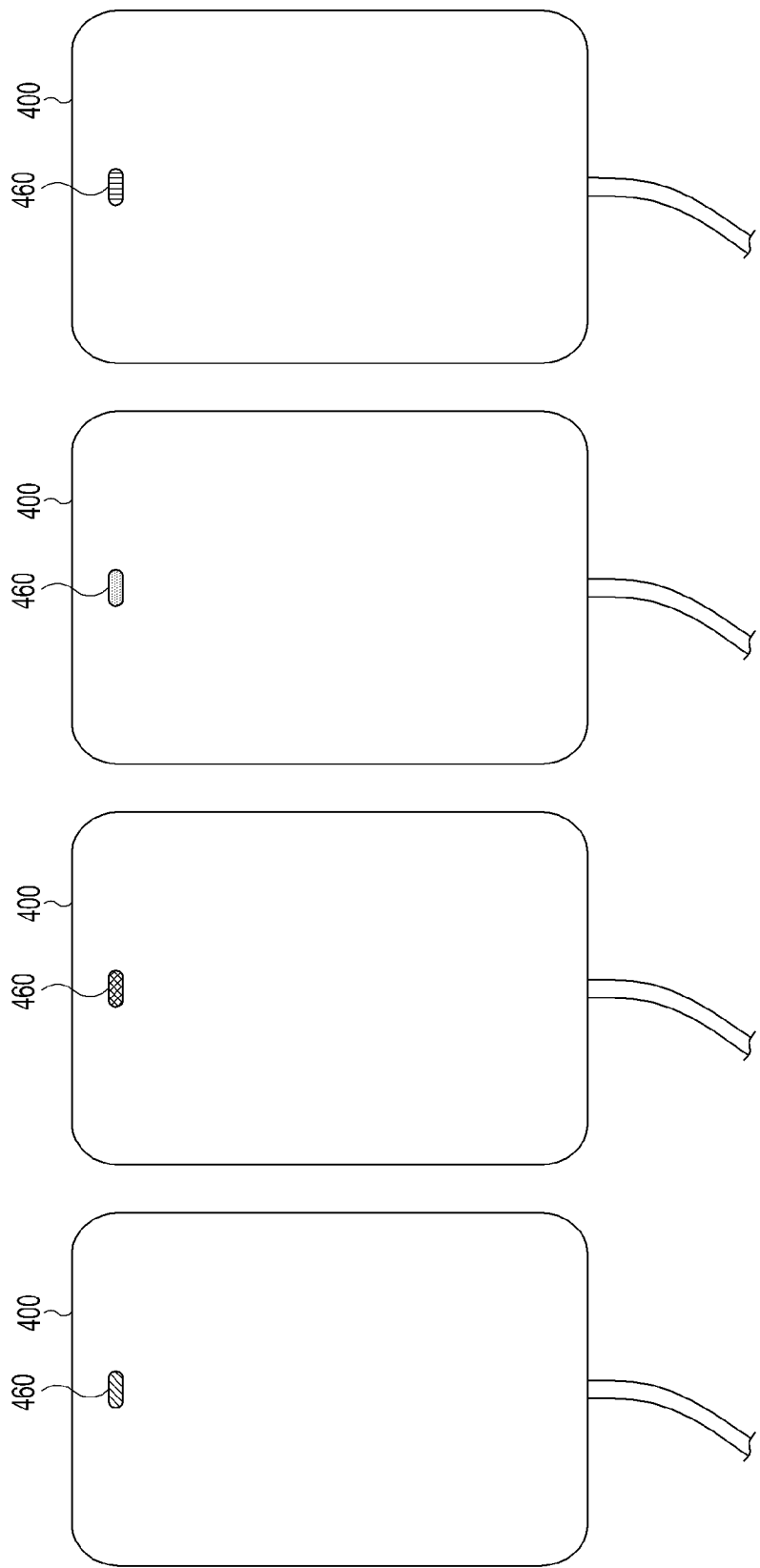

| CHARGING | RED |
|---|---|
| DISCHARGING | BLUE |
| CHARGING COMPLETED | GREEN |
| ERROR | YELLOW |

FIG.7A

| CHARGED LESS THAN 30% | LIGHT RED |
|---|---|
| CHARGED 30%~80% | RED |
| CHARGED OVER 80% | DARK RED |

FIG.7B

ELECTRONIC DEVICE AND METHOD FOR CHARGING AND DISCHARGING IN ELECTRONIC DEVICE

CROSS-REFERENCE TO RELATED APPLICATION(S)

This application claims the benefit under 35 U.S.C. § 119(a) of a Korean patent application filed on Oct. 6, 2014 in the Korean Intellectual Property Office and assigned Serial No. 10-2014-0134567, the entire disclosure of which is hereby incorporated by reference.

TECHNICAL FIELD

The present disclosure relates to an electronic device and a method for charging and discharging in the electronic device.

BACKGROUND

With the development of mobile communication technologies, users may carry a variety of electronic devices such as mobile terminals, smart phones or wearable devices, each of which has at least one information input/output function, a data processing and storing function, and the like.

These electronic devices may be powered by a rechargeable battery that may be charged through an external device that provides a battery charging function.

For example, if a battery of an electronic device is a detachable battery that can be detached from the electronic device, the battery, when detached from the electronic device, may be charged through a dedicated battery charger such as a battery charger (BTC), or the battery, when not detached from the electronic device, may be charged by directly connecting an external battery pack to the electronic device.

If a battery of an electronic device is not detached from the electronic device, the battery may be charged by directly connecting a charging cable to the electronic device, or the battery may be charged by directly connecting an external battery pack to the electronic device. According to the prior art, a device that provides a battery charging function may be a charging electronic device that provides a charging function, and/or a charging/discharging electronic device that provides both a charging function and a discharging function.

The charging/discharging electronic device that includes a charging port and a discharging port may charge the battery itself of the charging/discharging electronic device through the charging port, and perform a discharging function capable of charging a battery of an external electronic device through the discharging port. A battery charging device, which is implemented as a dedicated battery charger for a particular electronic device, may perform a charging function of receiving power supplied from an external power source and charging a battery of the particular electronic device with the received power.

However, in a case where a battery charging device performs a battery charging function only for a particular electronic device, the battery charging device cannot charge batteries of other electronic devices, and if a user no longer uses the particular electronic device, the user may not charge batteries of other electronic devices with the battery charging device.

In addition, the charging/discharging electronic device including a charging port and a discharging port may have a complex structure, since the charging/discharging electronic device requires two ports. The charging/discharging electronic device may not be designed in a compact design, since the mounting space for mounting the two ports is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device capable of performing charging and discharging functions using one port, and a method for charging and discharging in the electronic device.

In accordance with an aspect of the present disclosure, an electronic device is provided. The electronic device includes a connection terminal to which a charging cable or a discharging cable can be connected, a charging/discharging unit configured to perform a charging operation or a discharging operation, and a controller configured to perform a charging or discharging operation based on a cable connected to the connection terminal.

In accordance with another aspect of the present disclosure, a method for charging and discharging is provided. The method includes determining a cable connected to a connection terminal and performing charging or discharging based on the determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, and 6D illustrate an indication of a state of a charging/discharging device according to an embodiment of the present disclosure; and FIGS. 7A and 7B illustrate state indication tables in a charging/discharging device according to an embodiment of the present disclosure.

Throughout the drawings, like reference numerals will be understood to refer to like parts, components, and structures.

DETAILED DESCRIPTION

Figure 1:
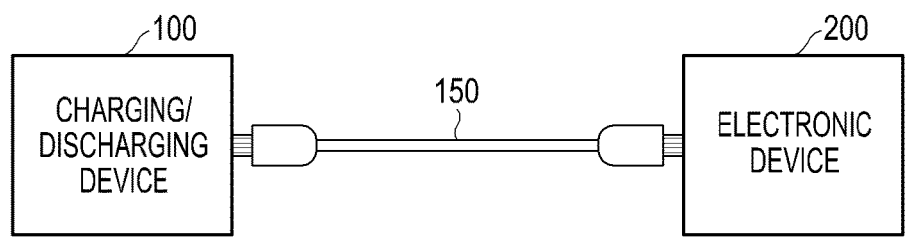
FIG. 1 illustrates a schematic concept of a charging/discharging device and an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" indicate the existence of a feature (e.g., a number, function, operation, or a component such as a part) and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

The terms as used herein are provided merely to describe various embodiments thereof, but not to limit the scope of other embodiments of the present disclosure. All terms including technical and scientific terms used herein have the same meaning as commonly understood by one of ordinary skill in the art to which the various embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude various embodiments of the present disclosure.

FIG. 1 illustrates a schematic concept of a charging/discharging electronic device and an electronic device according to an embodiment of the present disclosure.

Referring to FIG. 1, a charging/discharging electronic device (hereinafter referred to as a 'charging/discharging device') 100 may include at least one port, to which a connection device 150 may be connected, and the charging/discharging device 100 may be connected to an electronic device 200 through the connection device 150. The connection device 150 may be a discharging cable or a charging cable. The charging cable may include a voltage pin, a first data pin, a second data pin, or a ground (GND) pin. The discharging cable may include a voltage pin, a first data pin, a second data pin, a GND pin, or an identifier (ID) pin. According to an embodiment, the first data pin or the second data pin may not be included in either the charging cable or the discharging cable.

According to an embodiment of the present disclosure, if the connection device 150 is connected to the port, the charging/discharging device 100 may determine whether the discharging cable is connected or whether the charging cable is connected. For example, the charging/discharging device 100 may check a voltage on the voltage pin, and if it is checked that a voltage is applied thereto, the charging/discharging device 100 may determine that the charging cable is connected. According to an embodiment of the present disclosure, the charging/discharging device 100 may check an ID pin, and if it is checked that the ID pin is connected, the charging/discharging device 100 may determine that the discharging cable is connected. If the charging cable is connected, the charging/discharging device 100 may receive a charging current from the electronic device 200. If the discharging cable is connected, the charging/discharging device 100 may provide a charging current to the electronic device 200. The electronic device 200 may be a device that can receive a charging current supplied from the charging/discharging device 100, or a power supply device that can supply a charging current to the charging/discharging device 100.

According to various embodiments of the present disclosure, the electronic device 200 may be another charging/discharging device that is the same in structure as the charging/discharging device 100. According to various embodiments of the present disclosure, the electronic device 200 may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an moving picture experts group (MPEG) audio layer 3 (MP3) player, a mobile medical device, a camera, or a wearable device (e.g., a head mounted device (HMD) such as electronic glasses, electronic clothing, an electronic bracelet, an electronic necklace, E-App accessory (or appcessory), electronic tattoo, or smart watch).

In various embodiments, the electronic device 200 may be a smart home appliance. The smart home appliance may include at least one of, for example, a television (TV) set, a digital video disc (DVD) player, an audio player, a refrigerator, an air conditioner, a cleaner, an oven, a microwave oven, a washer, an air purifier, a set-top box, a TV box (e.g., Samsung HomeSync™, Apple TV™, or Google TV™), game consoles, an electronic dictionary, an electronic key, a camcorder, or an electronic photo frame.

In various embodiments, the electronic device 200 may include at least one of various medical devices (e.g., magnetic resonance angiography (MRA), magnetic resonance imaging (MRI), computed tomography (CT), a medical camcorder, an ultrasonic device and the like), a navigation device, a global positioning system (GPS) receiver, an event data recorder (EDR), a flight data recorder (FDR), a car infotainment device, a marine electronic device (e.g., a marine navigation device, a gyro compass and the like), avionics, a security device, or an industrial or household robot.

In various embodiments, the electronic device 200 may include at least one of a part of the furniture or building/structure, an electronic board, an electronic signature receiving device, a projector, or various meters (e.g., meters for water, electricity, gas or radio waves). The electronic device according to various embodiments of the present disclosure may be one or a combination of the above-described various devices. It will be apparent to those of ordinary skill in the art that the electronic device 200 according to various embodiments of the present disclosure is not limited to the above-described devices.

Figure 2:
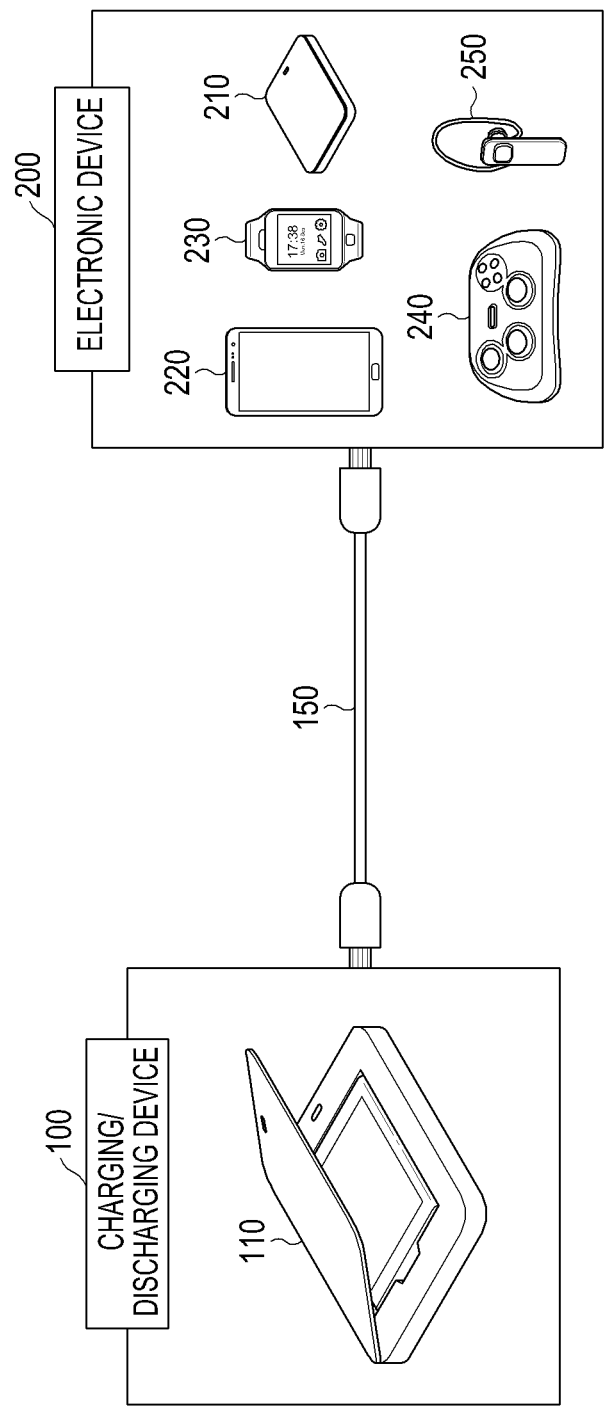
FIG. 2 illustrates an example of a charging/discharging device and an electronic device according to various embodiments of the present disclosure.

FIG. 2 illustrates an example of a charging/discharging device and an electronic device according to various embodiments of the present disclosure.

Referring to FIG. 2, the charging/discharging device 100 may be implemented in the form of a battery pack 110, and may be connected to various electronic devices 200 through a power sharing cable (also known as a charging/discharging cable or a connection device) 150. The electronic device 200 may be, for example, another charging/discharging device 210 that is the same in structure as the charging/discharging device 100, a smart phone 220, a wearable device 230, a game console 240, a wireless earphone 250, and the like. The power sharing cable 150 may include a charging terminal on one end and a discharging terminal on another end. If the charging terminal is connected to the charging/discharging device 100 and the discharging terminal is connected to the electronic device 200, the charging/discharging device 100 may perform the charging function by receiving a charging current supplied from the electronic device 200. If the discharging terminal is connected to the charging/discharging device 100 and the charging terminal is connected to the electronic device 200, the charging/discharging device 100 may perform the discharging function of providing a charging current to the electronic device 200.

In an embodiment, the charging/discharging device 100 may be an electronic device, and some of the electronic devices 200 may operate as a charging/discharging device. In an embodiment, the smart phone 220, which is one of the electronic devices, may operate as a charging/discharging device. In a case where the smart phone 220 operates as a charging/discharging device, if the charging terminal is connected to the smart phone 220 and the discharging terminal is connected to another electronic device, the smart phone 220 may perform the charging function by receiving a charging current supplied from another electronic device. On the other hand, if the discharging terminal is connected to the smart phone 220 and the charging terminal is connected to another electronic device, the smart phone 220 may perform the discharging function of providing a charging current to another electronic device.

Figure 3A:
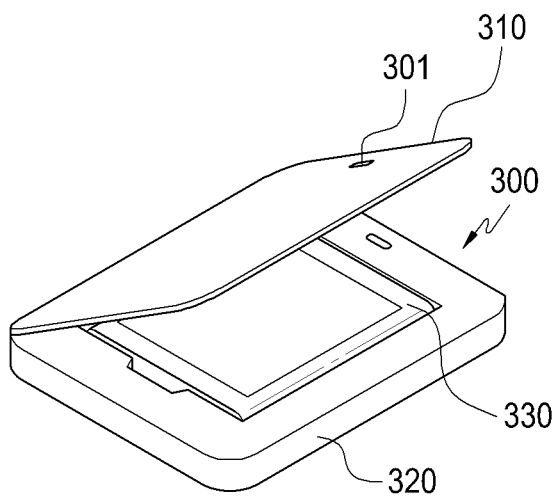
FIGS. 3A and 3B are external perspective views of a charging/discharging device according to an embodiment of the present disclosure.
Figure 3B:
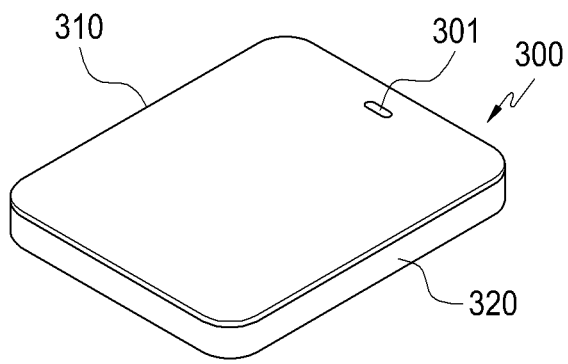

FIGS. 3A and 3B are external perspective views of a charging/discharging device according to an embodiment of the present disclosure. FIGS. 3A and 3B illustrate an example in which the charging/discharging device 100 is implemented in the form of a battery pack 300.

Referring to FIG. 3A, the battery pack 300 may include a cover 310 and a body 320, and the body 320 may have a space in which a battery 330 may be detachably mounted. On one side of the cover 310 may be mounted an indicator 301 that can indicate an error, charging or discharging states, etc.

Referring to FIG. 3B, the cover 310 may be provided to cover the body 320. In another embodiment, the indicator 301 may be mounted on the body 320 and a space or hole provided in the cover 310 such that the indicator 301 may be viewed through the cover 310 while it is closed over the body 320.

Figure 4:
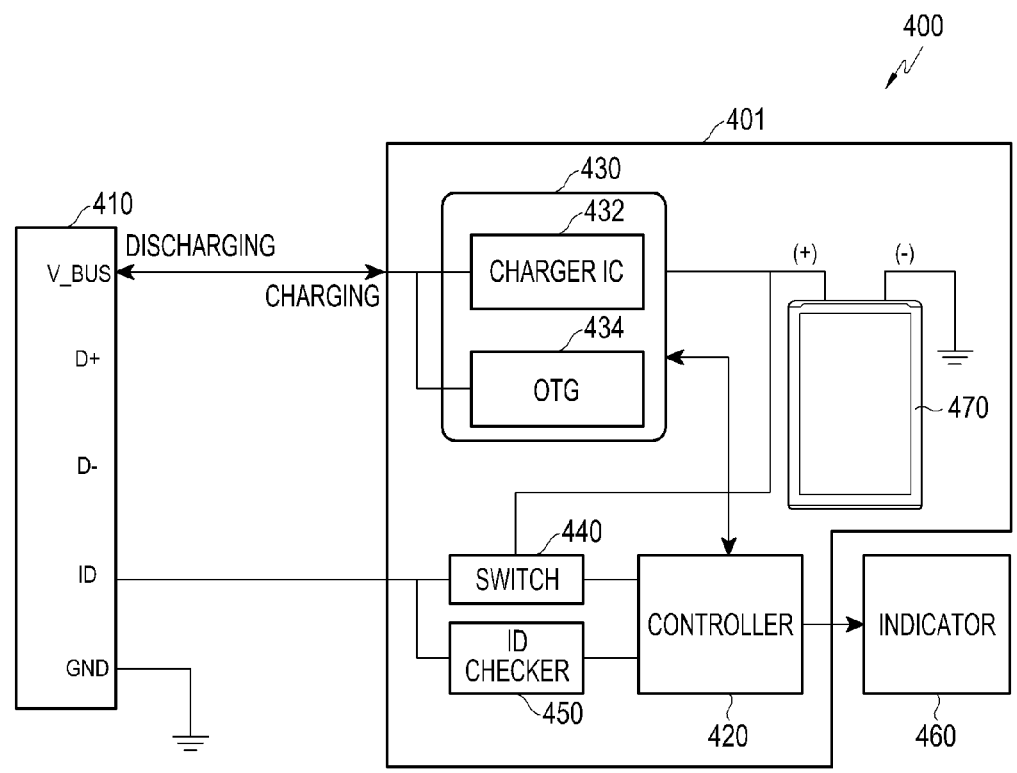
FIG. 4 is a block diagram of a charging/discharging device according to an embodiment of the present disclosure.

FIG. 4 is a block diagram of a charging/discharging device according to an embodiment of the present disclosure.

Referring to FIG. 4, a charging/discharging device 400 may include a connection terminal 410, a charging/discharging module 401 and an indicator 460.

In an embodiment, the connection terminal 410 may include a plurality of connection pins. The plurality of connection pins may include a voltage pin V_BUS, a first data pin D+, a second data pin D−, an ID pin ID, or a ground pin GND. In an embodiment, the connection terminal 410 may be a micro-universal serial bus (USB) terminal.

In an embodiment, the charging/discharging module 401 may include a controller 420, a charging/discharging unit 430, a switch 440, an ID checker 450, and a battery 470. The controller 420 may be a micro controller unit (MCU) or a CPU. The controller 420 may include a memory (e.g., a random access memory (RAM) or a read only memory (ROM)) that stores a control program for control of the charging/discharging device 400, and a signal or data received from the outside, or which is used as a workspace for an operation performed in the charging/discharging device 400. The controller 420 may determine whether a charging cable is connected to the connection terminal 410 or whether a discharging cable is connected to the connection terminal 410, by receiving from the connection terminal 410 a signal indicating whether the cable is connected to a plurality of connection pins, for example, whether the cable is connected to the voltage pin or the ID pin. If the charging cable is connected, the controller 420 may control the charging/discharging device 400 to perform charging. If the discharging cable is connected, the controller 420 may control the charging/discharging device 400 to perform discharging. In a case where the discharging cable is connected, the controller 420 may control the charging/discharging device 400 to perform discharging, only if an ID value corresponds to a predetermined ID.

In an embodiment, the charging/discharging unit 430 may include a charging module and a discharging module, and may operate under control of the controller 420. In an embodiment, the charging module may be a charger integrated circuit (IC) 432, and the discharging module may be an on-the-go (OTG) 434.

The charger IC 432, under control of the controller 420, may charge the battery 470 using a voltage received through the voltage pin V_BUS. The OTG 434, under control of the controller 420, may discharge the power of the battery 470 to the outside through the voltage pin V_BUS.

The switch 440 may perform a switching operation so that the controller 420 may be turned on, if an ID pin of an external connection device is connected to the ID pin of the connection terminal 410. The ID checker 450 may check an ID value given by the connection to the ID pin. In an embodiment, the ID checker 450 may be configured as a circuit that includes a predetermined resistor connected between the ID pin and the ground, and may check an ID value depending on a value of the voltage across the resistor.

The indicator 460 may be an indication device such as liquid crystal display (LCD), organic light emitting diodes (OLED), and LED. The indicator 460 may indicate the error, charging, or discharging states under control of the controller 420.

The battery 470 may be detachably mounted in the charging/discharging device 400. The battery 470 may be charged or discharged, while the battery 470 is mounted in the charging/discharging device 400.

In an embodiment, an electronic device may include a connection terminal to which a charging cable or a discharging cable can be connected, a charging/discharging unit configured to perform a charging operation or a discharging operation, and a controller configured to perform a charging or discharging operation based on a cable connected to the connection terminal.

In an embodiment, the connection terminal may include a voltage pin or an ID pin. In an embodiment, the controller is configured to determine whether the charging cable is connected, depending on whether a voltage is applied to the voltage pin, and to determine whether the discharging cable is connected, depending on whether the ID pin is connected.

In an embodiment, the electronic device may further include an ID checker configured to check an ID value of the ID pin. In an embodiment, the controller is configured to perform a discharging operation if an ID value of the ID pin is a predetermined ID value, and to handle an error if the ID value of the ID pin is not the predetermined ID value.

In an embodiment, the electronic device may further include an indicator configured to indicate a state of the electronic device.

In an embodiment, the state of the electronic device may include at least one of a charging state, a discharging state, a charging completed state, or an error state.

In an embodiment, the state of the electronic device may include a state of remaining charging capacity.

Figure 5:
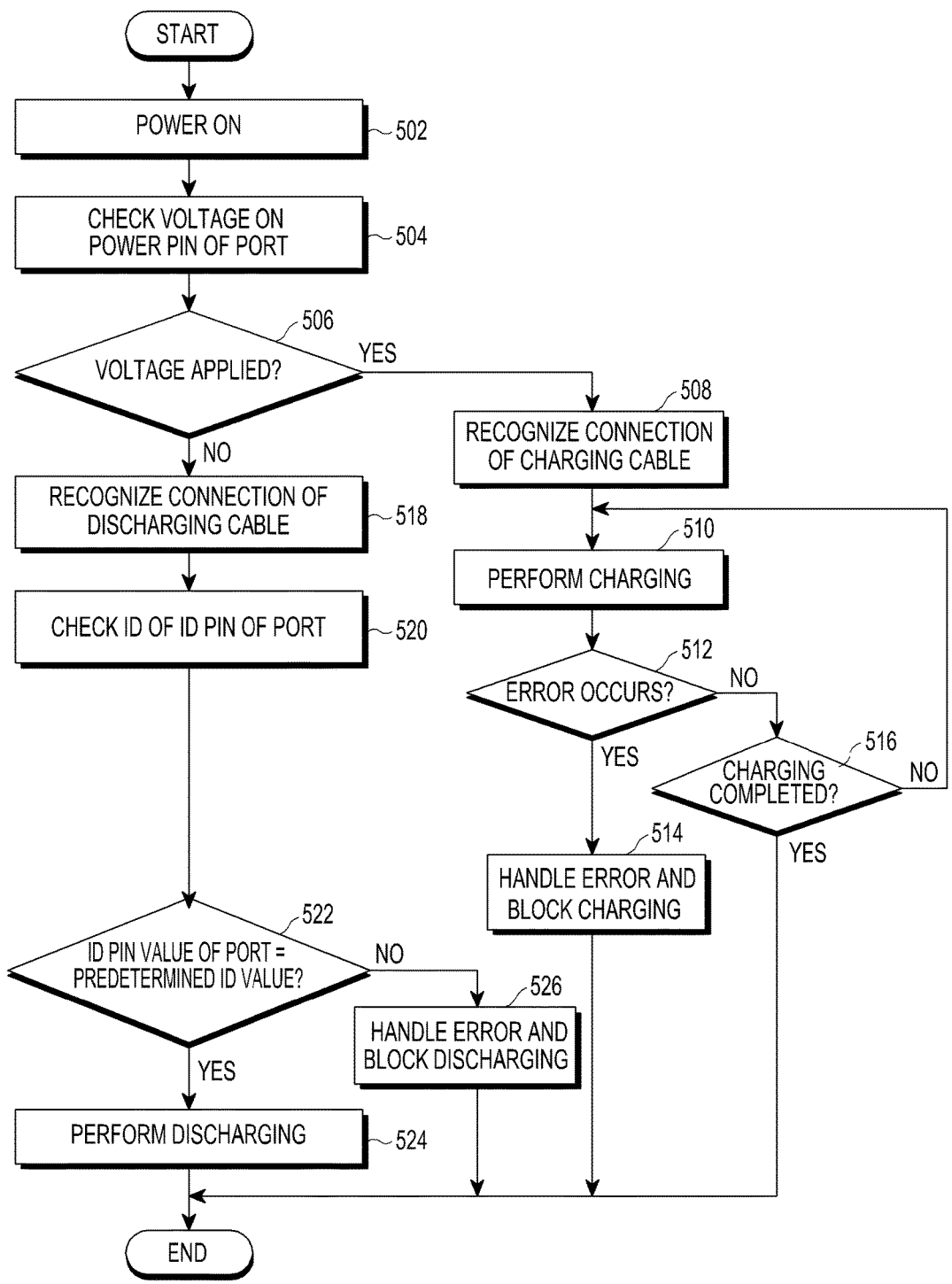
FIG. 5 is a flowchart illustrating a charging/discharging operation according to an embodiment of the present disclosure.

FIG. 5 is a flowchart illustrating a charging/discharging operation according to an embodiment of the present disclosure.

Referring to FIG. 5, the charging/discharging device 400 may perform a power-on operation in operation 502. In an embodiment, the charging/discharging device 400 may perform a power-on operation if a charging cable or a discharging cable is connected to the connection terminal (also called a port) 410. In an embodiment, the charging cable may be a cable corresponding to a device that provides a charging current by receiving the power supplied from an external power source such as a travel adaptor. In an embodiment, the discharging cable may be a cable that can discharge the power of the battery 470.

In operation 504, the charging/discharging device 400 may check a voltage on the voltage pin V_BUS among a plurality of pins of the port. The charging/discharging device 400 may determine in operation 506 whether a voltage is applied to the voltage pin V_BUS. In an embodiment, the charging/discharging device 400 may determine whether a predetermined voltage (e.g., 5V) is applied to the voltage pin V_BUS.

If a voltage is applied to the voltage pin V_BUS, the charging/discharging device 400 may recognize in operation 508 that the charging cable is connected to the port, and may perform charging in operation 510.

The charging/discharging device 400 may determine in operation 512 whether an error occurs while performing the charging. If an error occurs, the charging/discharging device 400 may handle an error and block or stop the charging in operation 514.

If it is determined that an error does not occur, the charging/discharging device 400 may determine in operation 516 whether the charging is completed. If the charging is not completed, the charging/discharging device 400 may continue charging in operation 510. On the other hand, if the charging is completed, the charging/discharging device 400 may terminate the charging.

If it is determined in operation 506 that no voltage is applied to the voltage pin V_BUS, the charging/discharging device 400 may recognize in operation 518 that the discharging cable is connected. In operation 520, the charging/discharging device 400 may check an ID value of the ID pin among a plurality of pins of the port.

The charging/discharging device 400 may determine in operation 522 whether an ID value of the ID pin is a predetermined ID value. If the ID value is the predetermined ID value, the charging/discharging device 400 may perform discharging in operation 524. In an embodiment, the predetermined ID value may be an ID value indicating a cable via which the charging/discharging device 400 can provide a charging current. If the ID value is not the predetermined ID value, the charging/discharging device 400 may handle an error and block or stop the discharging, in operation 526.

In an embodiment, a method for charging and discharging may include determining a cable connected to a connection terminal and performing charging or discharging based on the determination.

In an embodiment, determining the connected cable may include determining whether a charging cable is connected based on whether a voltage is applied to a voltage pin of the connection terminal.

In an embodiment, determining the connected cable may include determining whether a discharging cable is connected based on whether an ID pin of the connection terminal is connected.

In an embodiment, the method for charging and discharging may further include checking an ID value of the ID pin, and performing a discharging operation if the ID value of the ID pin is a predetermined ID value.

In an embodiment, the method for charging and discharging may further include indicating a charging/discharging state.

In an embodiment, the charging/discharging state may include at least one of a charging state, a discharging state, a charging completed state, or an error state.

In an embodiment, the charging/discharging state may include a state of remaining charging capacity.

FIGS. 6A to 6D illustrate an indication of a state of a charging/discharging device according to an embodiment of the present disclosure.

Referring to FIGS. 6A to 6D, the charging/discharging device 400 may differently operate the indicator 460 depending on the state of the charging/discharging device 400. In an embodiment, the charging/discharging device 400 may change a color of the indicator 460 depending on the discharging state, the charging state, the charging completed state, or the error state, as shown in FIGS. 6A to 6D. In another embodiment, the charging/discharging device 400 may change the color of the indicator 460 depending on how much the battery 470 is charged.

FIGS. 7A and 7B illustrate state indication tables in a charging/discharging device according to an embodiment of the present disclosure. The charging/discharging device 400 may change a color of the indicator 460 based on the charging level or the state of the charging/discharging device 400.

Referring to FIG. 7A, the charging/discharging device 400 may change the color of the indicator 460 to red in the charging state, to blue in the discharging state, to green in the charging completed state, and to yellow in the error state. Of course, these are merely examples of colors and states of the indicator 460 and the charging/discharging device 400. In other embodiments, the colors and states may be other than that described above.

Referring to FIG. 7B, the charging/discharging device 400 may change the color of the indicator 460 to light red if the battery 470 is charged less than 30%, to red if the battery 470 is charged 30%~80%, and to dark red if the battery 470 is charged over 80%. In addition, the indicator 460 may indicate various states of the charging/discharging device 400 in various different ways (e.g., in different blinking cycles). Of course, these are merely examples of different colors and charged percentages. In an embodiment of the present disclosure, any of the colors and percentages may be changed.

Each of the above-described components of the charging/discharging device according to various embodiments of the present disclosure may include one or more parts, and the names of the components may vary depending on the type of the charging/discharging device. The charging/discharging device according to various embodiments of the present disclosure may include at least one of the above components, some of which may be omitted, or may further include other additional components. Some of the components of the charging/discharging device according to various embodiments of the present disclosure may be configured as one entity by being combined, so the entity may perform the previous functions of the components in the same way.

As used herein, the term 'module' may refer to a unit that includes one of, or a combination of, for example, hardware, software or firmware. The term 'module' may be interchangeably used with the terms such as, for example, unit, logic, logical block, component or circuit. The module may be the minimum unit of a component that is configured as a single body, or a part thereof. The module may be the minimum unit that performs one or more functions, or a part thereof. The module may be implemented mechanically or electronically. For example, the module may include at least one of an application-specific IC (ASIC) chip, a field-programmable gate arrays (FPGAs) chip or a program-mable-logic device, which have been known, or will be developed in the future, and which may perform any operations.

At least a portion of the device (modules or their functions) or method (operations) according to various embodiments of the present disclosure may be implemented by, for example, a command that is stored in a computer-readable storage media in the form of a program module. If the command is executed by at least one processor (e.g., the controller 420), the at least one processor may perform a function corresponding to the command. The computer-readable storage media may be further included, for example, in the electronic device as a memory. At least a portion of the programming module may be implemented (e.g., executed) by, for example, the controller 420. At least a portion of the program module may include, for example, a module, a program, a routine, a set of instructions, or a process for performing one or more functions.

The computer-readable storage media may include magnetic media (e.g., a hard disk, a floppy disk and magnetic media), optical media (e.g., compact disc ROM (CD-ROM) and DVD), magneto-optical media (e.g., floptical disk)), and a hardware device (e.g., ROM, RAM or flash memory), which is specifically configured to store and execute a program command (e.g., a programming module). In addition, the program command may include not only the machine code made by the compiler, but also the high-level language code that can be executed by the computer using the interpreter and the like. The hardware device may be configured to operate as one or more software modules to perform the operations according to various embodiments of the present disclosure, and vice versa.

The module or programming module according to various embodiments of the present disclosure may include at least one of the above-described components, some of which can be omitted, or may further include other additional components. The operations performed by the module, the programming module or other components according to various embodiments of the present disclosure may be performed in a sequential, parallel, iterative or heuristic manner. In addition, some operations may be performed in a different order, or omitted, or other operations may be added.

As is apparent from the foregoing description, according to various embodiments of the present disclosure, if the power sharing cable (e.g., the discharging cable) is connected to a port in the charging/discharging device that uses one port, the charging/discharging device may perform discharging, and if the power supply device (e.g., the charging cable) is connected to the port, the charging/discharging device may perform charging, thereby promoting the user convenience.

In addition, according to various embodiments of the present disclosure, the charging/discharging device may determine whether to perform discharging by recognizing whether the ID pin of the port is connected, making it possible to manufacture the charging/discharging device in a simple manner.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a connection terminal to which an external device can be connected;

a charging/discharging unit configured to perform a charging operation or a discharging operation; and
a controller configured to control to:
    determine whether the external device is connected to the connection terminal;
    perform the charging operation when a voltage is detected via the connection terminal, and
    perform the discharging operation when an identifier (ID) is detected via the connection terminal and the voltage is not detected via the connection terminal,
wherein the ID indicates that the external device is provided with a charging current by the discharging operation.

2. The electronic device of claim 1, wherein the connection terminal includes a voltage pin and an ID pin, and
wherein the controller is configured to detect the voltage using the voltage pin and detect the ID using the ID pin.

3. The electronic device of claim 2,
wherein the external device includes a charging cable and a discharging cable, and
wherein the controller is further configured to:
    determine whether the charging cable is connected depending on whether a voltage is applied to the voltage pin, and
    determine whether the discharging cable is connected depending on whether the ID pin is connected.

4. The electronic device of claim 2, further comprising an ID checker configured to check an ID value of the ID pin.

5. The electronic device of claim 4, wherein the controller is further configured to:
    perform a discharging operation if an ID value of the ID pin is a predetermined ID value, and
    handle an error if the ID value of the ID pin is not the predetermined ID value.

6. The electronic device of claim 1, further comprising an indicator configured to indicate a state of the electronic device.

7. The electronic device of claim 6, wherein the state of the electronic device includes at least one of a charging state, a discharging state, a charging completed state, or an error state.

8. The electronic device of claim 6, wherein the state of the electronic device includes a state of remaining charging capacity.

9. The electronic device of claim 6, wherein the indicator comprises at least one of a liquid crystal display, an organic light emitting diode, or a light emitting diode.

10. The electronic device of claim 9, wherein the indicator is configured to change at least one of a displayed color or a displayed intensity based on the state of the electronic device.

11. A method for charging and discharging, the method comprising:
    determining, by an electronic device, whether the external device is connected to the connection terminal of the electronic device;
    performing a charging operation when a voltage is detected via the connection terminal; and
    performing a discharging operation when an identifier (ID) is detected via the connection terminal and the voltage is not detected via the connection terminal,
wherein the ID indicates that the external device is provided with a charging current by the discharging operation.

12. The method of claim 11,
wherein the external device includes a charging cable, and
wherein it is determined whether the charging cable is connected based on whether a voltage is applied to a voltage pin of the connection terminal.

13. The method of claim 11,
wherein the external device includes a discharging cable, and
wherein it is determined whether the discharging cable is connected based on whether an ID pin of the connection terminal is connected.

14. The method of claim 13, further comprising:
checking an ID value of the ID pin; and
performing a discharging operation if the ID value of the ID pin is a predetermined ID value.

15. The method of claim 11, further comprising indicating a charging/discharging state.

16. The method of claim 15, wherein the charging/discharging state includes at least one of a charging state, a discharging state, a charging completed state, or an error state.

17. The method of claim 15, wherein the charging/discharging state includes a state of remaining charging capacity.

18. The method of claim 15, wherein the indicating of the charging/discharging state comprises illuminating at least one of a liquid crystal display, an organic light emitting diode, or a light emitting diode.

19. The method of claim 18, wherein the illuminating comprises changing at least one of a displayed color or a displayed intensity based on the charging/discharging state of the electronic device.

* * * * *